US012617414B2

(12) United States Patent
Bangalore Ravi et al.

(10) Patent No.: US 12,617,414 B2
(45) Date of Patent: May 5, 2026

(54) ALIGNING SENSOR DATA FOR VEHICLE APPLICATIONS

(71) Applicant: QUALCOMM Incorporated, San Diego, CA (US)

(72) Inventors: Kiran Bangalore Ravi, Paris (FR); Varun Ravi Kumar, San Diego, CA (US); Senthil Kumar Yogamani, Headford (IE)

(73) Assignee: QUALCOMM Incorporated, San Diego, CA (US)

( * ) Notice: Subject to any disclaimer, the term of this patent is extended or adjusted under 35 U.S.C. 154(b) by 266 days.

(21) Appl. No.: 18/448,034

(22) Filed: Aug. 10, 2023

(65) Prior Publication Data

US 2025/0050894 A1 Feb. 13, 2025

(51) Int. Cl.
| | |
|---|---|
| *G06T 7/33* | (2017.01) |
| *B60W 50/06* | (2006.01) |
| *G06T 7/35* | (2017.01) |

(52) U.S. Cl.
CPC .............. *B60W 50/06* (2013.01); *G06T 7/33* (2017.01); *G06T 7/35* (2017.01); *B60W 2556/35* (2020.02); *G06T 2207/10028* (2013.01); *G06T 2207/20081* (2013.01); *G06T 2207/30252* (2013.01)

(58) Field of Classification Search
CPC ..... B60W 50/06; B60W 2556/35; G06T 7/33; G06T 7/35; G06T 2207/10028; G06T 2207/20081; G06T 2207/30252; G06V 10/80; G06V 20/56
See application file for complete search history.

(56) References Cited

U.S. PATENT DOCUMENTS

| | | | | |
|---|---|---|---|---|
| 11,409,304 B1 * | 8/2022 | Cai | ............................ | B60R 1/00 |
| 11,422,546 B2 * | 8/2022 | Giering | ................. | G06F 18/251 |
| 12,008,786 B2 * | 6/2024 | Lawlor | .............. | G01C 21/3848 |
| 12,023,812 B2 * | 7/2024 | Casas | ..................... | B25J 9/1664 |
| 12,054,164 B2 * | 8/2024 | Tsai | .................... | B60W 60/001 |
| 12,060,082 B1 * | 8/2024 | Garimella | ....... | B60W 30/18159 |

(Continued)

OTHER PUBLICATIONS

International Search Report and Written Opinion—PCT/US2024/031437—ISA/EPO—Sep. 19, 2024.

(Continued)

*Primary Examiner* — Peter D Nolan
(74) *Attorney, Agent, or Firm* — Norton Rose Fulbright US LLP/ QUALCOMM Incorporated

(57) ABSTRACT

This disclosure provides systems, methods, and devices for vehicle driving assistance systems that support image processing. A method is disclosed for aligning top-down features from two sensor arrangements and generating vehicle control instructions. The method includes receiving first sensor data from a first sensor arrangement and second sensor data from a second sensor arrangement. The method further includes determining a first set of top-down and a second set of top-down features based on the sensor data. A transformation is determined based on the first set of top-down features and the second set of top-down features to align the second set of top-down features with the first set of top-down features. Finally, vehicle control instructions for a vehicle are determined based on the transformation. Other aspects and features are also claimed and described.

30 Claims, 7 Drawing Sheets

(56)  References Cited

U.S. PATENT DOCUMENTS

| | | | | |
|---|---|---|---|---|
| 12,263,849 B2* | 4/2025 | Tang | | B60W 60/0011 |
| 12,271,974 B2* | 4/2025 | Ding | | G06V 10/26 |
| 12,286,103 B2* | 4/2025 | Toyoda | | B60W 30/095 |
| 12,306,298 B2* | 5/2025 | Weikersdorfer | | G01S 15/931 |
| 12,330,821 B2* | 6/2025 | Xu | | G08G 1/04 |
| 2021/0051317 A1* | 2/2021 | Yan | | G06T 7/80 |
| 2021/0131821 A1* | 5/2021 | Wang | | G01C 21/3852 |
| 2021/0132612 A1* | 5/2021 | Wang | | G06V 20/13 |
| 2021/0150230 A1* | 5/2021 | Smolyanskiy | | G06V 10/82 |
| 2021/0224616 A1* | 7/2021 | Kim | | G06V 20/588 |
| 2022/0198700 A1* | 6/2022 | Lawlor | | G01C 21/3848 |
| 2022/0413509 A1* | 12/2022 | Grabner | | G05D 1/0253 |
| 2023/0112441 A1* | 4/2023 | Tang | | G06V 10/806 |
| | | | | 701/1 |
| 2023/0252896 A1* | 8/2023 | Xu | | G08G 1/0125 |
| | | | | 701/117 |
| 2023/0252903 A1* | 8/2023 | Xu | | G08G 5/26 |
| | | | | 701/3 |
| 2024/0199035 A1* | 6/2024 | Vora | | G06V 10/751 |

OTHER PUBLICATIONS

Harley A.W., et al., "Simple-BEV: What Really Matters for Multi-Sensor BEV Perception?", arXiv:2206.07959v2 [cs.CV] Sep. 29, 2022, 7 Pages.

Liu Z., et al., "BEVFusion: Multi-Task Multi-Sensor Fusion with Unified Bird's-Eye View Representation", arXiv:2205.13542v2[cs.Cv] Jun. 16, 2022, 12 Pages.

Sun B., et al., "Deep Coral: Correlation Alignment for Deep Domain Adaptation", arXiv:1607.01719v1[cs.CV] Jul. 6, 2016, pp. 1-7.

Tan D., "A Hands-On Application of Homography: IPM", Towards Data Science, May 14, 2020, pp. 1-10.

* cited by examiner

: Position Sensor

: Image Sensor

510

500

600

RECEIVE FIRST SENSOR DATA FROM A FIRST SENSOR ARRANGEMENT AND SECOND SENSOR DATA FROM A SECOND SENSOR ARRANGEMENT, WHEREIN AT LEAST ONE OF THE FIRST SENSOR DATA AND THE SECOND SENSOR DATA INCLUDE BOTH IMAGE DATA AND POSITION DATA ⟋ 602

DETERMINE, BASED ON THE FIRST SENSOR DATA, A FIRST SET OF TOP-DOWN FEATURES AND, BASED ON THE SECOND SENSOR DATA, A SECOND SET OF TOP-DOWN FEATURES ⟋ 604

DETERMINE, BASED ON THE FIRST SET OF TOP-DOWN FEATURES AND THE SECOND SET OF TOP-DOWN FEATURES, A TRANSFORMATION TO ALIGN THE SECOND SET OF TOP-DOWN FEATURES WITH THE FIRST SET OF TOP-DOWN FEATURES ⟋ 606

DETERMINE, BASED ON THE TRANSFORMATION, VEHICLE CONTROL INSTRUCTIONS FOR A VEHICLE ⟋ 608

*FIG. 6*

ALIGNING SENSOR DATA FOR VEHICLE APPLICATIONS

TECHNICAL FIELD

Aspects of the present disclosure relate generally to driver-operated or driver-assisted vehicles, and more particularly, to methods and systems suitable for supplying driving assistance or for autonomous driving.

INTRODUCTION

Vehicles take many shapes and sizes, are propelled by a variety of propulsion techniques, and carry cargo including humans, animals, or objects. These machines have enabled the movement of cargo across long distances, movement of cargo at high speed, and movement of cargo that is larger than could be moved by human exertion. Vehicles originally were driven by humans to control speed and direction of the cargo to arrive at a destination. Human operation of vehicles has led to many unfortunate incidents resulting from the collision of vehicle with vehicle, vehicle with object, vehicle with human, or vehicle with animal. As research into vehicle automation has progressed, a variety of driving assistance systems have been produced and introduced. These include navigation directions by GPS, adaptive cruise control, lane change assistance, collision avoidance systems, night vision, parking assistance, and blind spot detection.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Human operators of vehicles can be distracted, which is one factor in many vehicle crashes. Driver distractions can include changing the radio, observing an event outside the vehicle, and using an electronic device, etc. Sometimes circumstances create situations that even attentive drivers are unable to identify in time to prevent vehicular collisions. Aspects of this disclosure, provide improved systems for assisting drivers in vehicles with enhanced situational awareness when driving on a road.

In one aspect, a method is provided that includes receiving first sensor data from a first sensor arrangement and second sensor data from a second sensor arrangement, wherein at least one of the first sensor data and the second sensor data include both image data and position data. The method further includes determining, based on the first sensor data, a first set of top-down features and, based on the second sensor data, a second set of top-down features and determining, based on the first set of top-down features and the second set of top-down features, a transformation to align the second set of top-down features with the first set of top-down features. The method also includes determining, based on the transformation, vehicle control instructions for a vehicle.

In another aspect, a system is provided that includes a processing system including one or more processors and one or more memories storing instructions which, when executed by the processing system, cause the processing system to perform operations. The operations include receiving first sensor data from a first sensor arrangement and second sensor data from a second sensor arrangement, wherein at least one of the first sensor data and the second sensor data include both image data and position data. The operations further include determining, based on the first sensor data, a first set of top-down features and, based on the second sensor data, a second set of top-down features and determining, based on the first set of top-down features and the second set of top-down features, a transformation to align the second set of top-down features with the first set of top-down features. The operations also include determining, based on the transformation, vehicle control instructions for a vehicle.

In an additional aspect, a non-transitory, computer-readable medium is provided storing instructions which, when executed by a processor, cause the processor to perform operations. The operations include receiving first sensor data from a first sensor arrangement and second sensor data from a second sensor arrangement, wherein at least one of the first sensor data and the second sensor data include both image data and position data. The operations further include determining, based on the first sensor data, a first set of top-down features and, based on the second sensor data, a second set of top-down features and determining, based on the first set of top-down features and the second set of top-down features, a transformation to align the second set of top-down features with the first set of top-down features. The operations also include determining, based on the transformation, vehicle control instructions for a vehicle.

In a further aspect, a vehicle is provided that includes a processing system including one or more processors and one or more memories storing instructions which, when executed by the processing system, cause the processing system to perform operations. The operations include receiving first sensor data from a first sensor arrangement and second sensor data from a second sensor arrangement, wherein at least one of the first sensor data and the second sensor data include both image data and position data. The operations further include determining, based on the first sensor data, a first set of top-down features and, based on the second sensor data, a second set of top-down features and determining, based on the first set of top-down features and the second set of top-down features, a transformation to align the second set of top-down features with the first set of top-down features. The operations also include determining, based on the transformation, vehicle control instructions for a vehicle.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) ng networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). 5G networks include diverse deployments, diverse spectrum, and diverse services and devices that may be implemented using an OFDM-based unified, air interface.

The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur.

Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the below description and examples use the term "device" to describe various aspects of the disclosure, the term "device" is not limited to a specific configuration, type, or number of objects. As used herein, an apparatus may include a device or a portion of the device for performing the described operations.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination.

Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof.

Also, as used herein, the term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

Also, as used herein, relative terms, unless otherwise specified, may be understood to be relative to a reference by a certain amount. For example, terms such as "higher" or "lower" or "more" or "less" may be understood as higher, lower, more, or less than a reference value by a threshold amount.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 6 is a flow chart illustrating an example method for alignment of sensor data and top-down features between different sensor arrangements according to one or more aspects of the disclosure.

Like reference numbers and designations in the various drawings indicate like elements.

DETAILED DESCRIPTION

Figure 1:
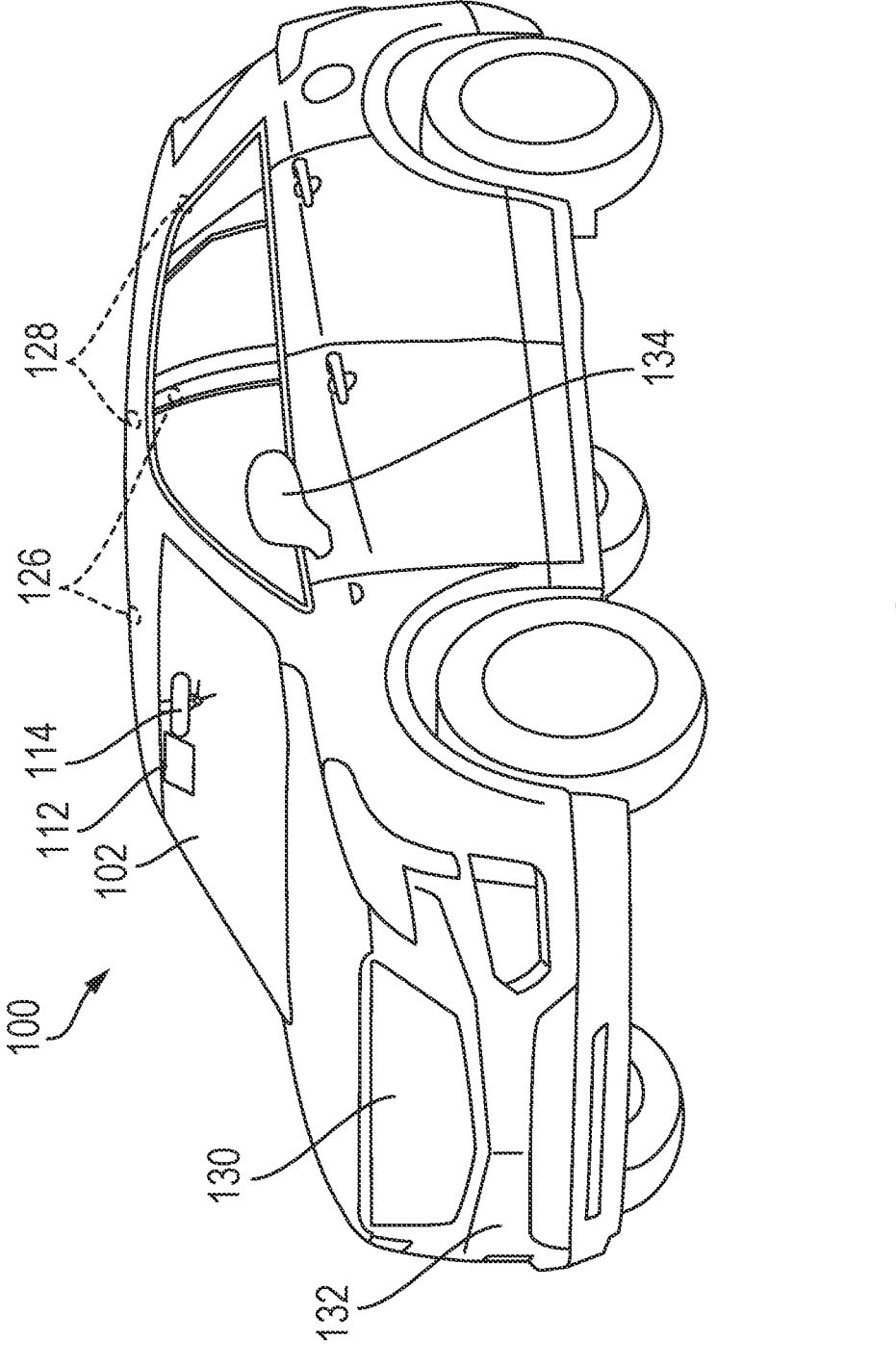
FIG. 1 is a perspective view of a motor vehicle with a driver monitoring system according to embodiments of this disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support alignment of sensor data and top-down features between different sensor arrangements. In particular, different types of vehicles may have different sensor setups, which may be used in self-driving, driver assistance, monitoring, and other vehicle applications. This variability can include differences in the number of image sensors and position sensors, as well as their orientations and placement. Additionally, there may be variations in the lens geometry and distortion in cameras, as well as scanning patterns and intensity channels of different LIDAR sensors. Models (such as perception models) used in such vehicle applications are frequently trained using one sensor arrangement. Often, these models cannot be deployed on new sensor sets with different cameras or lidars, such as because the different sensor arrangements have different features or feature values.

Existing systems may address these issues by creating training datasets for target sensor arrangements to retrain or update existing models, but this can be slow and costly. Additionally, target sensor arrangements may be simpler than the source arrangement, with some sensors removed, certain sensor types omitted, or other simplifications. Datasets for arrangements with simpler setups may not be straightforwardly prepared for adaptation to arrangements with more sensors. To address these challenges, complete perception systems for AVs often deploy multi-sensor fusion techniques that allow, e.g., camera, LIDAR, and radar data to be detected in different modalities and fused together to improve robustness and precision. However, these pipelines often need to be separately aligned with corresponding pipelines, which can create excessive complexity. This can increase processing times and can drastically reduce the ability to adapt from one arrangement with a certain type of sensor to another arrangement that lacks or has fewer of that type of sensor.

One solution to this problem is to use a single transformation to align sensor data from a new sensor arrangement with sensor data from a previous sensor arrangement on which a perception model has been trained. In particular, a first set of top-down features in the second set of top-down features may be determined for sensor data received from two different sensor arrangements. A transformation may then be determined that can be applied to the second set of top-down features to align the second set of top-down features with the first set of top-down features. In certain implementations, the transformation may be a variational autoencoder model trained to transform the second set of top-down features. In particular, the transformation may be trained to translate between sensor arrangements with different types of sensors, different numbers of sensors, and multiple types of sensors. As one specific example, one or both of the sensor arrangements may include both position sensors and image sensors, and the transformation may be determined to transform features from both position data and image data. The transformation may then be used to determine vehicle control instructions.

Stated differently, vehicle sensor arrangements may have large variability across manufacturers. Autonomous perception models are typically trained using one sensor set and may be deployed on new sensor sets with different characteristics (different types of sensors, different locations, different extrinsics, different intrinsics). In a typical approach, domain adaption models may applied per modality for image and position sensors separately. This approach fails to consider joint image-position features and thus objects present in different fields of view (FOVs) and distortions are not jointly modeled. Models (such as neural network models) trained for fusion on a source sensor set to a target sensor set. To address these issues, the following deviations between sensor arrangements may be monitored and aligned: (i) any deviations in the target sensor suite relative to source suit in extrinsics, (ii) difference in photometric/pixel space as well as across different features (such as using stochastic distance between images and point cloud intensities), and (iii) cross-sensor set cross-domain alignment. A variational autoencoder may be used to minimize KL-divergence between various pairs of source-target sensor arrangements and latent space top-view feature distributions.

Particular implementations of the subject matter described in this disclosure may be implemented to realize one or more of the following potential advantages or benefits. In some aspects, the present disclosure provides techniques for image processing that may be particularly beneficial in smart vehicle applications. For example, the described techniques may improve the ability of adapting sensor data between different types of sensor arrangements, improving the accuracy of vehicle applications and subsequent vehicle control instructions, such as those generated using models trained on a specific arrangement of sensors. One particular area of improvement includes object tracking using sensor data from various sensor arrangements. One major benefit of improved object tracking is that it allows vehicle control systems to more accurately navigate vehicles around obstacles. This can be particularly useful in situations where there may be unexpected obstructions or road conditions that could pose a hazard to drivers. Additionally, improved tracking can help to improve overall safety on the roads by reducing vehicle collisions. With better tracking capabilities, vehicles can be made more responsive to nearby obstacles and can be routed around detected obstacles more efficiently. These improvements can also extend to driver assistance systems, which can benefit from increased monitoring capabilities. By expanding the number, type, and variety of surrounding vehicles that can be detected, these systems can offer more accurate alerts and assistance to drivers when necessary, without generating unnecessary notifications or distractions.

Additionally, these techniques may improve and expand the usability of perception models and the like in largescale production environment, such as when Original Equipment Manufacturers (OEMs) move from one sensor suite to another, such as in different vehicle makes. These techniques may improve the ability for models trained on one type of vehicle's sensors to be used with data from another type of vehicle's sensors. This may reduce costs of training or updating new models and may improve the quality of perception in particular zones around a vehicle (such as by providing better FOV coverage), as more features are able to be detected and transferred between sensor arrangements. Furthermore, these techniques may reduce the cost, such as by reducing the need to create extensive separate databases for many different vehicle types, or by reducing the size of such databases that need to be prepared. Such techniques may also reduce the computational intensity at runtime by reducing the number of separate models that need to be executed to intake sensor data and associated sensor features.

FIG. 1 is a perspective view of a motor vehicle with a driver monitoring system according to embodiments of this disclosure. A vehicle 100 may include a front-facing camera 112 mounted inside the cabin looking through the windshield 102. The vehicle may also include a cabin-facing camera 114 mounted inside the cabin looking towards occupants of the vehicle 100, and in particular the driver of the vehicle 100. Although one set of mounting positions for cameras 112 and 114 are shown for vehicle 100, other mounting locations may be used for the cameras 112 and 114. For example, one or more cameras may be mounted on one of the driver or passenger B pillars 126 or one of the driver or passenger C pillars 128, such as near the top of the pillars 126 or 128. As another example, one or more cameras may be mounted at the front of vehicle 100, such as behind the radiator grill 130 or integrated with bumper 132. As a further example, one or more cameras may be mounted as part of a driver or passenger side mirror assembly 134.

The camera 112 may be oriented such that the field of view of camera 112 captures a scene in front of the vehicle 100 in the direction that the vehicle 100 is moving when in drive mode or in a forward direction. In some embodiments, an additional camera may be located at the rear of the vehicle 100 and oriented such that the field of view of the additional camera captures a scene behind the vehicle 100 in the direction that the vehicle 100 is moving when in reverse mode or in a reverse direction. Although embodiments of the disclosure may be described with reference to a "front-facing" camera, referring to camera 112, aspects of the disclosure may be applied similarly to a "rear-facing" camera facing in the reverse direction of the vehicle 100. Thus, the benefits obtained while the vehicle 100 is traveling in a forward direction may likewise be obtained while the vehicle 100 is traveling in a reverse direction.

Further, although embodiments of the disclosure may be described with reference a "front-facing" camera, referring to camera 112, aspects of the disclosure may be applied similarly to an input received from an array of cameras mounted around the vehicle 100 to provide a larger field of view, which may be as large as 360 degrees around parallel to the ground and/or as large as 360 degrees around a vertical direction perpendicular to the ground. For example, additional cameras may be mounted around the outside of vehicle 100, such as on or integrated in the doors, on or integrated in the wheels, on or integrated in the bumpers, on or integrated in the hood, and/or on or integrated in the roof.

The camera 114 may be oriented such that the field of view of camera 114 captures a scene in the cabin of the vehicle and includes the user operator of the vehicle, and in particular the face of the user operator of the vehicle with sufficient detail to discern a gaze direction of the user operator.

Each of the cameras 112 and 114 may include one, two, or more image sensors, such as including a first image sensor. When multiple image sensors are present, the first image sensor may have a larger field of view (FOV) than the second image sensor or the first image sensor may have different sensitivity or different dynamic range than the second image sensor. In one example, the first image sensor may be a wide-angle image sensor, and the second image sensor may be a telephoto image sensor. In another example, the first sensor is configured to obtain an image through a first lens with a first optical axis and the second sensor is configured to obtain an image through a second lens with a second optical axis different from the first optical axis. Additionally or alternatively, the first lens may have a first magnification, and the second lens may have a second magnification different from the first magnification. This configuration may occur in a camera module with a lens cluster, in which the multiple image sensors and associated lenses are located in offset locations within the camera module. Additional image sensors may be included with larger, smaller, or same fields of view.

Each image sensor may include means for capturing data representative of a scene, such as image sensors (including charge-coupled devices (CCDs), Bayer-filter sensors, infrared (IR) detectors, ultraviolet (UV) detectors, complimentary metal-oxide-semiconductor (CMOS) sensors), and/or time of flight detectors. The apparatus may further include one or more means for accumulating and/or focusing light rays into the one or more image sensors (including simple lenses, compound lenses, spherical lenses, and non-spherical lenses). These components may be controlled to capture the first, second, and/or more image frames. The image frames may be processed to form a single output image frame, such as through a fusion operation, and that output image frame further processed according to the aspects described herein.

As used herein, image sensor may refer to the image sensor itself and any certain other components coupled to the image sensor used to generate an image frame for processing by the image signal processor or other logic circuitry or storage in memory, whether a short-term buffer or longer-term non-volatile memory. For example, an image sensor may include other components of a camera, including a shutter, buffer, or other readout circuitry for accessing individual pixels of an image sensor. The image sensor may further refer to an analog front end or other circuitry for converting analog signals to digital representations for the image frame that are provided to digital circuitry coupled to the image sensor.

Figure 2:
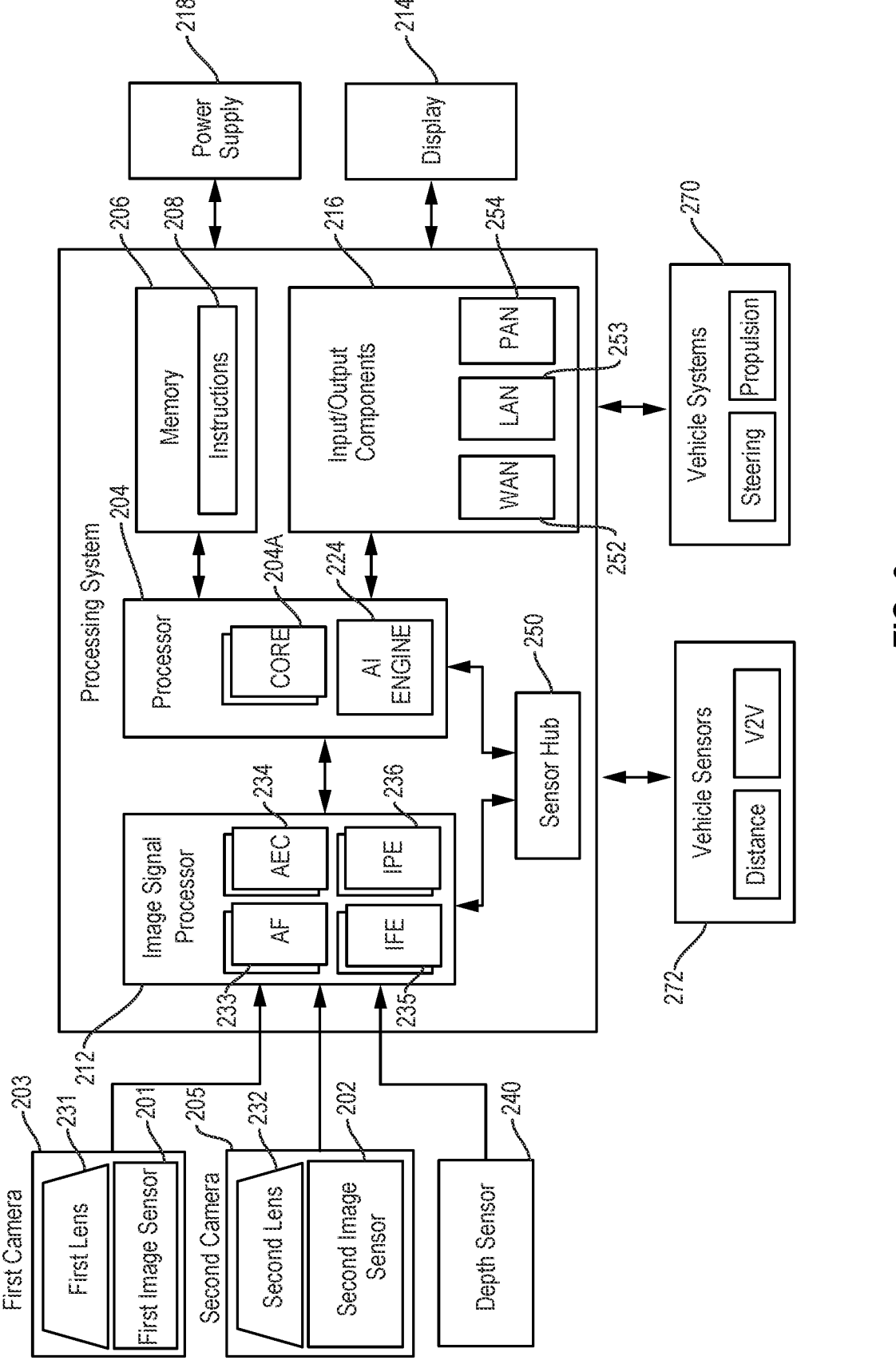
FIG. 2 shows a block diagram of an example image processing configuration for a vehicle according to one or more aspects of the disclosure.

FIG. 2 shows a block diagram of an example image processing configuration for a vehicle according to one or more aspects of the disclosure. The vehicle 100 may include, or otherwise be coupled to, an image signal processor 212 for processing image frames from one or more image sensors, such as a first image sensor 201, a second image sensor 202, and a depth sensor 240. In some implementations, the vehicle 100 also includes or is coupled to a processor (e.g., CPU) 204 and a memory 206 storing instructions 208. The device 100 may also include or be coupled to a display 214 and input/output (I/O) components 216. I/O components 216 may be used for interacting with a user, such as a touch screen interface and/or physical buttons. I/O components 216 may also include network interfaces for communicating with other devices, such as other vehicles, an operator's mobile devices, and/or a remote monitoring system. The network interfaces may include one or more of a wide area network (WAN) adaptor 252, a local area network (LAN) adaptor 253, and/or a personal area network (PAN) adaptor 254. An example WAN adaptor 252 is a 4G LTE or a 5G NR wireless network adaptor. An example LAN adaptor 253 is an IEEE 802.11 WiFi wireless network adapter. An example PAN adaptor 254 is a Bluetooth wireless network adaptor. Each of the adaptors 252, 253, and/or 254 may be coupled to an antenna, including multiple antennas configured for primary and diversity reception and/or configured for receiving specific frequency bands. The vehicle 100 may further include or be coupled to a power supply 218, such as a battery or an alternator. The vehicle 100 may also include or be coupled to additional features or components that are not shown in FIG. 2. In one example, a wireless interface, which may include one or more transceivers and associated baseband processors, may be coupled to or included in WAN adaptor 252 for a wireless communication device. In a further example, an analog front end (AFE) to convert analog image frame data to digital image frame data may be coupled between the image sensors 201 and 202 and the image signal processor 212.

The vehicle 100 may include a sensor hub 250 for interfacing with sensors to receive data regarding movement of the vehicle 100, data regarding an environment around the vehicle 100, and/or other non-camera sensor data. One example non-camera sensor is a gyroscope, a device configured for measuring rotation, orientation, and/or angular velocity to generate motion data. Another example non-camera sensor is an accelerometer, a device configured for measuring acceleration, which may also be used to determine velocity and distance traveled by appropriately integrating the measured acceleration, and one or more of the acceleration, velocity, and or distance may be included in generated motion data. In further examples, a non-camera sensor may be a global positioning system (GPS) receiver, a light detection and ranging (LiDAR) system, a radio detection and ranging (RADAR) system, or other ranging systems. For example, the sensor hub 250 may interface to a vehicle bus for sending configuration commands and/or receiving information from vehicle sensors 272, such as distance (e.g., ranging) sensors or vehicle-to-vehicle (V2V) sensors (e.g., sensors for receiving information from nearby vehicles).

The image signal processor (ISP) 212 may receive image data, such as used to form image frames. In one embodiment, a local bus connection couples the image signal processor 212 to image sensors 201 and 202 of a first camera 203, which may correspond to camera 112 of FIG. 1, and second camera 205, which may correspond to camera 114 of FIG. 1, respectively. In another embodiment, a wire interface may couple the image signal processor 212 to an external image sensor. In a further embodiment, a wireless interface may couple the image signal processor 212 to the image sensor 201, 202.

The first camera 203 may include the first image sensor 201 and a corresponding first lens 231. The second camera 205 may include the second image sensor 202 and a corresponding second lens 232. Each of the lenses 231 and 232 may be controlled by an associated autofocus (AF) algorithm 233 executing in the ISP 212, which adjust the lenses 231 and 232 to focus on a particular focal plane at a certain scene depth from the image sensors 201 and 202. The AF algorithm 233 may be assisted by depth sensor 240. In some embodiments, the lenses 231 and 232 may have a fixed focus.

The first image sensor 201 and the second image sensor 202 are configured to capture one or more image frames. Lenses 231 and 232 focus light at the image sensors 201 and 202, respectively, through one or more apertures for receiving light, one or more shutters for blocking light when outside an exposure window, one or more color filter arrays (CFAs) for filtering light outside of specific frequency ranges, one or more analog front ends for converting analog measurements to digital information, and/or other suitable components for imaging.

In some embodiments, the image signal processor 212 may execute instructions from a memory, such as instructions 208 from the memory 206, instructions stored in a separate memory coupled to or included in the image signal processor 212, or instructions provided by the processor 204. In addition, or in the alternative, the image signal processor 212 may include specific hardware (such as one or more integrated circuits (ICs)) configured to perform one or more operations described in the present disclosure. For example, the image signal processor 212 may include one or more image front ends (IFEs) 235, one or more image post-processing engines (IPEs) 236, and or one or more auto exposure compensation (AEC) 234 engines. The AF 233, AEC 234, IFE 235, IPE 236 may each include application-specific circuitry, be embodied as software code executed by the ISP 212, and/or a combination of hardware within and software code executing on the ISP 212.

In some implementations, the memory 206 may include a non-transient or non-transitory computer readable medium storing computer-executable instructions 208 to perform all or a portion of one or more operations described in this disclosure. In some implementations, the instructions 208 include a camera application (or other suitable application) to be executed during operation of the vehicle 100 for generating images or videos. The instructions 208 may also include other applications or programs executed for the vehicle 100, such as an operating system, mapping applications, or entertainment applications. Execution of the camera application, such as by the processor 204, may cause the vehicle 100 to generate images using the image sensors 201 and 202 and the image signal processor 212. The memory 206 may also be accessed by the image signal processor 212 to store processed frames or may be accessed by the processor 204 to obtain the processed frames. In some embodiments, the vehicle 100 includes a system on chip (SoC) that incorporates the image signal processor 212, the processor 204, the sensor hub 250, the memory 206, and input/output components 216 into a single package.

In some embodiments, at least one of the image signal processor 212 or the processor 204 executes instructions to perform various operations described herein, including object detection, risk map generation, driver monitoring, and driver alert operations. For example, execution of the instructions can instruct the image signal processor 212 to begin or end capturing an image frame or a sequence of image frames. In some embodiments, the processor 204 may include one or more general-purpose processor cores 204A capable of executing scripts or instructions of one or more software programs, such as instructions 208 stored within the memory 206. For example, the processor 204 may include one or more application processors configured to execute the camera application (or other suitable application for generating images or video) stored in the memory 206.

In executing the camera application, the processor 204 may be configured to instruct the image signal processor 212 to perform one or more operations with reference to the image sensors 201 or 202. For example, the camera application may receive a command to begin a video preview display upon which a video comprising a sequence of image frames is captured and processed from one or more image sensors 201 or 202 and displayed on an informational display on display 114 in the cabin of the vehicle 100.

In some embodiments, the processor 204 may include ICs or other hardware (e.g., an artificial intelligence (AI) engine 224) in addition to the ability to execute software to cause the vehicle 100 to perform a number of functions or operations, such as the operations described herein. In some other embodiments, the vehicle 100 does not include the processor 204, such as when all of the described functionality is configured in the image signal processor 212.

In some embodiments, the display 214 may include one or more suitable displays or screens allowing for user interaction and/or to present items to the user, such as a preview of the image frames being captured by the image sensors 201 and 202. In some embodiments, the display 214 is a touch-sensitive display. The I/O components 216 may be or include any suitable mechanism, interface, or device to receive input (such as commands) from the user and to provide output to the user through the display 214. For example, the I/O components 216 may include (but are not limited to) a graphical user interface (GUI), a keyboard, a mouse, a microphone, speakers, a squeezable bezel, one or more buttons (such as a power button), a slider, a switch, and so on. In some embodiments involving autonomous driving, the I/O components 216 may include an interface to a vehicle's bus for providing commands and information to and receiving information from vehicle systems 270 including propulsion (e.g., commands to increase or decrease speed or apply brakes) and steering systems (e.g., commands to turn wheels, change a route, or change a final destination).

While shown to be coupled to each other via the processor 204, components (such as the processor 204, the memory 206, the image signal processor 212, the display 214, and the I/O components 216) may be coupled to each another in other various arrangements, such as via one or more local buses, which are not shown for simplicity. While the image signal processor 212 is illustrated as separate from the processor 204, the image signal processor 212 may be a core of a processor 204 that is an application processor unit (APU), included in a system on chip (SoC), or otherwise included with the processor 204. While the vehicle 100 is referred to in the examples herein for including aspects of the present disclosure, some device components may not be shown in FIG. 2 to prevent obscuring aspects of the present disclosure. Additionally, other components, numbers of components, or combinations of components may be included in a suitable vehicle for performing aspects of the present disclosure. As such, the present disclosure is not limited to a specific device or configuration of components, including the vehicle 100.

Figure 3:
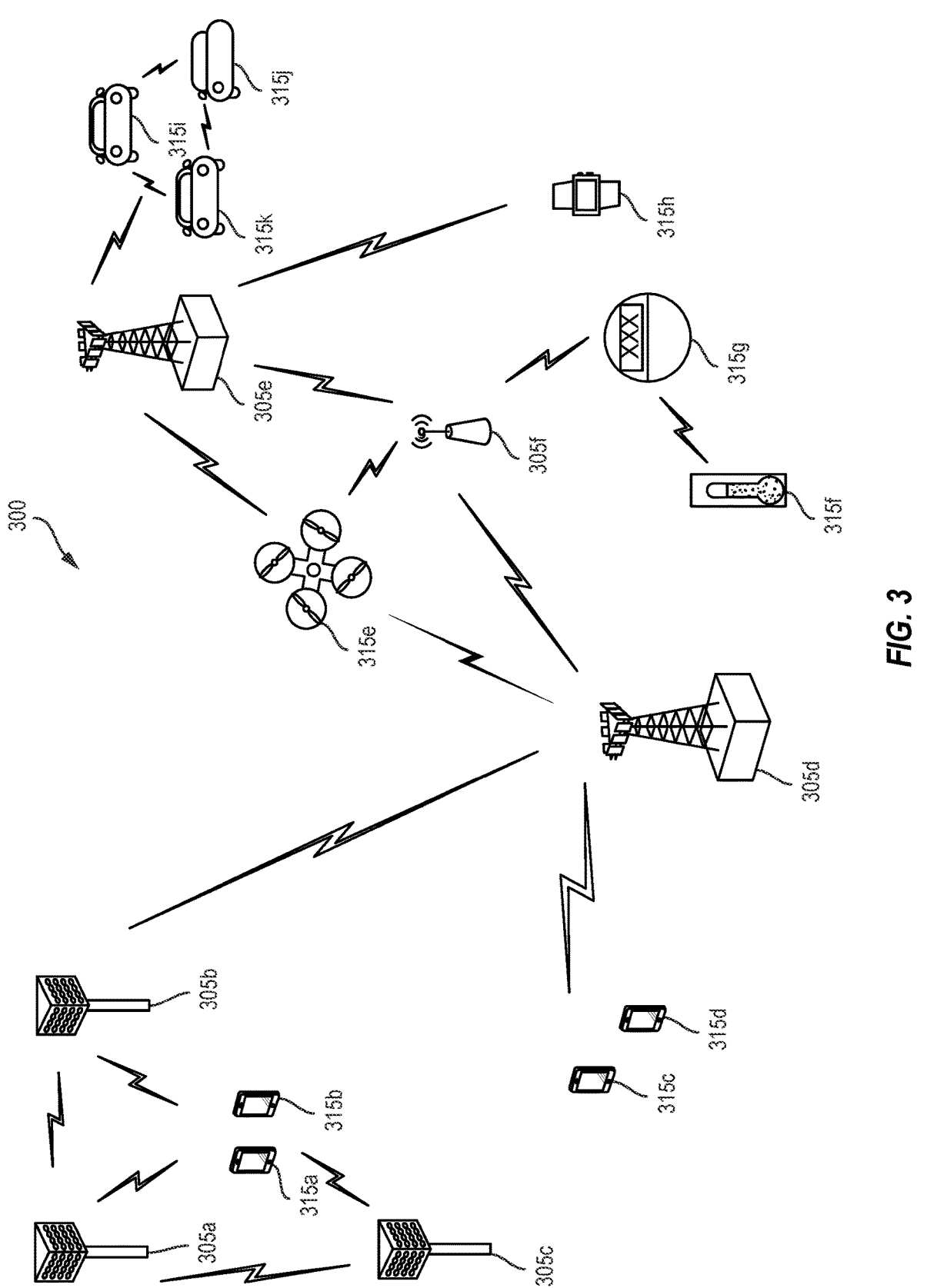
FIG. 3 is a block diagram illustrating details of an example wireless communication system according to one or more aspects.

The vehicle 100 may communicate as a user equipment (UE) within a wireless network 300, such as through WAN adaptor 252, as shown in FIG. 3. FIG. 3 is a block diagram illustrating details of an example wireless communication system according to one or more aspects. Wireless network 300 may, for example, include a 5G wireless network. As appreciated by those skilled in the art, components appearing in FIG. 3 are likely to have related counterparts in other network arrangements including, for example, cellular-style network arrangements and non-cellular-style-network arrangements (e.g., device-to-device or peer-to-peer or ad-hoc network arrangements, etc.).

Wireless network 300 illustrated in FIG. 3 includes base stations 305 and other network entities. A base station may be a station that communicates with the UEs and may also be referred to as an evolved node B (eNB), a next generation eNB (gNB), an access point, and the like. Each base station 305 may provide communication coverage for a particular geographic area. In 3GPP, the term "cell" may refer to this particular geographic coverage area of a base station or a base station subsystem serving the coverage area, depending on the context in which the term is used. In implementations of wireless network 300 herein, base stations 305 may be associated with a same operator or different operators (e.g., wireless network 300 may include a plurality of operator wireless networks). Additionally, in implementations of wireless network 300 herein, base station 305 may provide wireless communications using one or more of the same frequencies (e.g., one or more frequency bands in licensed spectrum, unlicensed spectrum, or a combination thereof) as a neighboring cell. In some examples, an individual base station 305 or UE 315 may be operated by more than one network operating entity. In some other examples, each base station 305 and UE 315 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 3, base stations 305*d* and 305*e* are regular macro base stations, while base stations 305*a*-305*c* are macro base stations enabled with one of three-dimension (3D), full dimension (FD), or massive MIMO. Base stations 305*a*-305*c* take advantage of their higher dimension MIMO capabilities to exploit 3D beamforming in both elevation and azimuth beamforming to increase coverage and capacity. Base station 305f is a small cell base station which may be a home node or portable access point. A base station may support one or multiple (e.g., two, three, four, and the like) cells.

Wireless network 300 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 315 are dispersed throughout the wireless network 300, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology.

Some non-limiting examples of a mobile apparatus, such as may include implementations of one or more of UEs 315, include a mobile, a cellular (cell) phone, a smart phone, a session initiation protocol (SIP) phone, a wireless local loop (WLL) station, a laptop, a personal computer (PC), a notebook, a netbook, a smart book, a tablet, a personal digital assistant (PDA), and a vehicle. Although UEs 315a-j are specifically shown as vehicles, a vehicle may employ the communication configuration described with reference to any of the UEs 315a-315k.

In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 315a-315d of the implementation illustrated in FIG. 3 are examples of mobile smart phone-type devices accessing wireless network 300. A UE may also be a machine specifically configured for connected communication, including machine type communication (MTC), enhanced MTC (eMTC), narrowband IoT (NB-IoT) and the like. UEs 315e-315k illustrated in FIG. 3 are examples of various machines configured for communication that access wireless network 300.

A mobile apparatus, such as UEs 315, may be able to communicate with any type of the base stations, whether macro base stations, pico base stations, femto base stations, relays, and the like. In FIG. 3, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 300 may occur using wired or wireless communication links.

In operation at wireless network 300, base stations 305a-305c serve UEs 315a and 315b using 3D beamforming and coordinated spatial techniques, such as coordinated multipoint (CoMP) or multi-connectivity. Macro base station 305d performs backhaul communications with base stations 305a-305c, as well as small cell, base station 305f. Macro base station 305d also transmits multicast services which are subscribed to and received by UEs 315c and 315d. Such multicast services may include mobile television or stream video, or may include other services for providing community information, such as weather emergencies or alerts, such as Amber alerts or gray alerts.

Wireless network 300 of implementations supports mission critical communications with ultra-reliable and redundant links for mission critical devices, such UE 315e, which is a drone. Redundant communication links with UE 315e include from macro base stations 305d and 305e, as well as small cell base station 305f. Other machine type devices, such as UE 315f (thermometer), UE 315g (smart meter), and UE 315h (wearable device) may communicate through wireless network 300 either directly with base stations, such as small cell base station 305f, and macro base station 305e, or in multi-hop configurations by communicating with another user device which relays its information to the network, such as UE 315f communicating temperature measurement information to the smart meter, UE 315g, which is then reported to the network through small cell base station 305f. Wireless network 300 may also provide additional network efficiency through dynamic, low-latency TDD communications or low-latency FDD communications, such as in a vehicle-to-vehicle (V2V) mesh network between UEs 315i-315k communicating with macro base station 305e.

Figure 4:
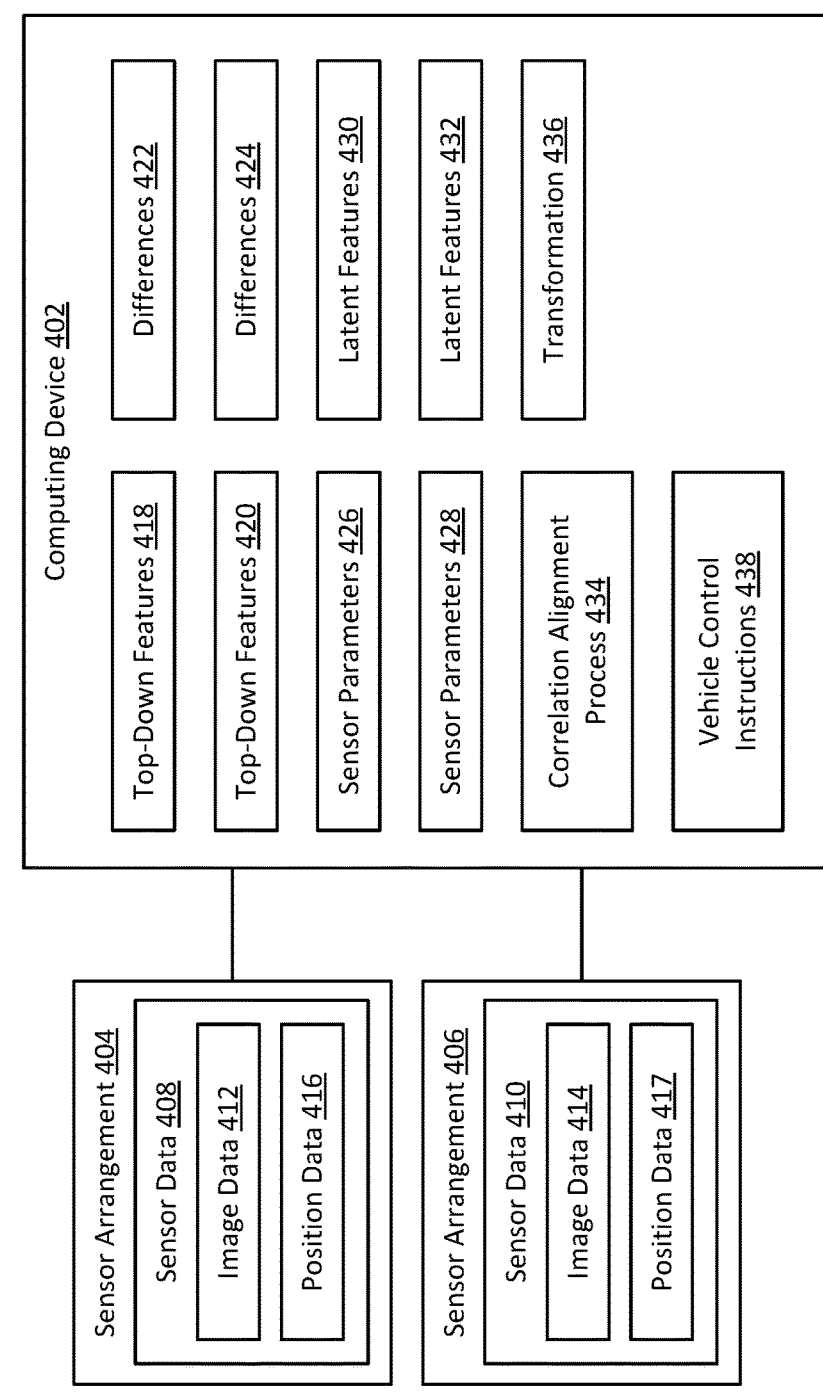
FIG. 4 is a block diagram illustrating a system for alignment of sensor data and top-down features between different sensor arrangements according to one or more aspects of the disclosure.

Aspects of the vehicular systems described with reference to, and shown in, FIG. 1, FIG. 2, and FIG. 3 may include alignment of sensor data and top-down features between different sensor arrangements. For example, FIG. 4 is a block diagram illustrating a system 400 for adaptive multimodal fusion of sensor data according to one aspect of the present disclosure. The system 400 may be an exemplary implementation of one or more above-discussed aspects. For example, the system 400 may be contained within the vehicle 100, may be an exemplary implementation of the processing system in FIG. 2 (such as the ISP 212, the processor 204, or combinations thereof), and the like.

The system 400 includes a computing device 402, a first sensor arrangement 404, and a second sensor arrangement 406. The first sensor arrangement 404 includes first sensor data 408, which includes image data 412 and position data 416. The second sensor arrangement 406 includes second sensor data 410, which includes image data 414 and position data 417. The computing device 402 includes a first set of top-down features 418, a second set of top-down features 420, a transformation 436, first differences 422, second differences 424, a first set of sensor parameters 426, a second set of sensor parameters 428, a first set of latent features 430, a second set of latent features 432, a correlation alignment process 434, and vehicle control instructions 438.

The computing device 402 may be configured to receive first sensor data 408 from a first sensor arrangement 404 and second sensor data 410 from a second sensor arrangement 406. In certain implementations, the first sensor data 408 may represent a source domain and the second sensor data 410 may represent a target domain, such as for the purposes of a domain alignment process. For example, the second sensor data 410 may need to be aligned with the first sensor data 408 for use in subsequent perception, guidance, or other vehicle-related tasks, as explained further below.

In certain implementations, the first sensor data 408 and the second sensor data 410 may be captured from an area surrounding a vehicle. For example, the first sensor arrangement 404 and the second sensor arrangement 406 may each be located on a respective vehicle. In certain implementations, the first sensor arrangement 404 may be located on a separate vehicle from the second sensor arrangement 406. In certain implementations, the first sensor arrangement 404 and the second sensor arrangement 406 may be located on the same vehicle (such as for training data collection purposes). In certain implementations, the first sensor data 408 and/or the second sensor data 410 may include data captured from multiple vehicles. For example, the first sensor data 408 may include data captured for multiple vehicles with the first sensor arrangement 404 and the second sensor data 410 may include data captured for multiple vehicles with the second sensor arrangement 406. In certain implementations, multiple vehicles with the same arrangement may include vehicles of a particular model. In particular, the computing device 402 may be configured to determine the transformation 436 to align sensor data received from a first vehicle model with a first sensor arrangement 404 to sensor data received from a second vehicle model with a second sensor arrangement 406.

In certain implementations, sensor data included within the first sensor data 408 and the second sensor data 410 may include image data 412, 414 captured from one or more image sensors, position data 416, 417 captured from one or more position sensors, or combinations thereof. In certain implementations, image data 412, 414 may include one or more image frames captured from one or more image sensors located on the vehicle. In certain implementations, image data 412, 414 may include a stream of image frames, such as image frames contained within a video sequence captured by an image sensor on a regular basis. In certain implementations, position data may include measured position information (such as two-dimensional position information, three-dimensional position information) for objects located within an area surrounding a vehicle. In certain implementations, the position data 416, 417 may be measured as point clouds for objects located within the area surrounding the vehicle. In certain such implementations, the point clouds may be measured by LIDAR sensors, radar sensors, ultrasonic sensors, or combinations thereof. In certain implementations, the position data 416, 417 may include point cloud position information for various points along an exterior surface of an object and may also include position information for other objects or an area surrounding the object. In certain implementations, the first sensor data 408 and/or the second sensor data 410 may include time series data, such as a time series sequence of image data 412, 414 and/or position data 416, 417 captured at regular intervals.

In certain implementations, the first sensor arrangement 404 and the second sensor arrangement 406 may include different combinations and/or different physical arrangements of one or more sensors located on corresponding vehicles. In certain implementations, the first sensor arrangement 404 and the second sensor arrangement 406 may have different types of sensors (such as different types of image sensors, different types of position sensors). Different types of sensors may include different models of sensors, different operating ranges for sensors (such as different fields of view, different scanning frequencies, different point cloud densities, different numbers of position scanning layers). In certain implementations, the first sensor arrangement 404 and the second sensor arrangement 406 may have different numbers of certain types of sensors (such as a different number of image sensors, a different number of position sensors). In still further implementations, the first sensor arrangement and the second sensor arrangement 406 may have sensors located in different positions on the vehicle.

In certain implementations, the sensor arrangements 404, 406 may have different types of sensors that capture different types of data. For example, the first sensor arrangement 404 includes a LIDAR sensor and the second sensor arrangement 406 does not. As another example, the second sensor arrangement 406 includes a LIDAR sensor and the first sensor arrangement 404 does not.

Figure 5A:
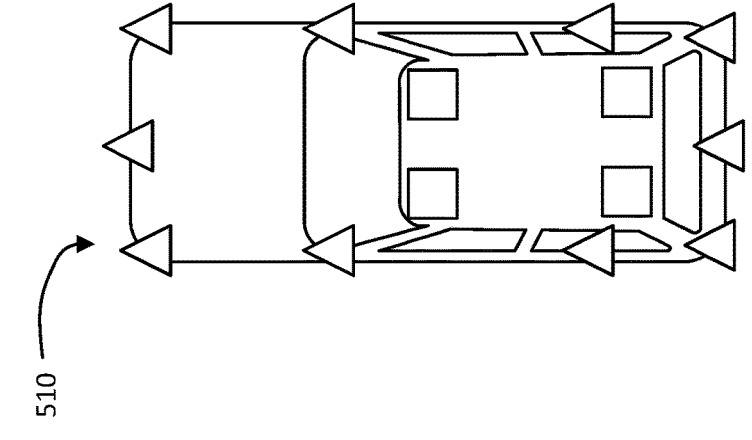
FIG. 5A depicts sensor arrangements according to aspects of the present disclosure.

As one specific example, FIG. 5A depicts sensor arrangements 500, 510 according to aspects of the present disclosure. The sensor arrangements 500, 510 have image sensors and position sensors in different numbers, whose positions are indicated with corresponding shapes in FIG. 5A (triangles identify locations of image sensors, squares identify locations of position sensors). In particular, the sensor arrangement 500 includes 4 image sensors located on the front, rear, left side, and right side of the vehicle. Each image sensor may have a field of view (FOV) of 170-180 degrees. The sensor arrangement 500 also includes a single position sensor, which may be a LIDAR sensor with a 360-degree field of view. Notably, none of the image sensors in the sensor arrangement 500 may overlap with one another. The sensor arrangement 510 includes 10 image sensors and 4 position sensors. The image sensors may have a smaller field of view than the image sensors in the sensor arrangement 500, such as a field of view of 60-100 degrees. The position sensors may each have a field of view of 360 degrees and may accordingly overlap with one another. In certain implementations, the position sensors in the sensor arrangement 510 may have different operating characteristics from the position sensors in the sensor arrangement 500 (such as a lower sampling rate, fewer layers, and the like).

Returning to FIG. 4, the computing device 402 may be configured to determine, based on the first sensor data 408, a first set of top-down features 418. The computing device may also determine, based on the second sensor data 410, a second set of top-down features 420. In certain implementations, features for images may include numerical representations of various aspects of an image frame. Some examples of features include color histograms, texture descriptors, edge detection, and shape analysis. Color histograms may quantify the distribution of colors in an image, while texture descriptors may capture patterns such as roughness or smoothness. Edge detections may identify boundaries between objects in an image, while shape analysis may identify or otherwise distinguish different types of objects based on geometric properties of the object within the image frame. In certain implementations, features for position data may include numerical representations of various aspects of a point cloud. Some examples of features include distance histograms, surface normals, curvature estimation, and segmentation. Distance histograms may quantify the distribution of distances between points in a point cloud, while surface normals may capture the orientation of local surfaces. Curvature estimation may measure the degree of bending or flatness of a surface, while segmentation may identify or otherwise distinguish different types of objects based on spatial proximity and similarity of the points within the point cloud.

In certain implementations, the features may be stored in feature vectors. The feature vectors may be single-dimensional, such as an N×1 vector, where N may be the number of features. In additional or alternative implementations, feature vectors may be multi-dimensional, such as an N×M×O vector, where at least two of N, M, and O are greater than 1.

In certain implementations, the top-down features may be features such as those described above that are projected or otherwise positioned into a top-down view of a vehicle. Top-down views may provide top-down (or bird's eye view) representations of vehicles and their surroundings. Top-down views may consist of a grid-based image or other representation (such as a 128-by-128 pixel representation) that depict objects or obstacles located within the vehicle's vicinity (such as within a predetermined range of the vehicle). Top-down views may also include metadata or other indications that identify particular types of objects or obstacles located within each pixel of the grid. In particular, the top-down features may specify locations within top-down views for the corresponding features (such as within a feature vector containing the feature). In certain implementations, the top-down features may individually specify corresponding locations for each feature and feature value. In additional or alternative implementations, the top-down view may include multiple feature vectors, where each feature vector corresponds to a particular location within the top-down representation.

Figure 5A:
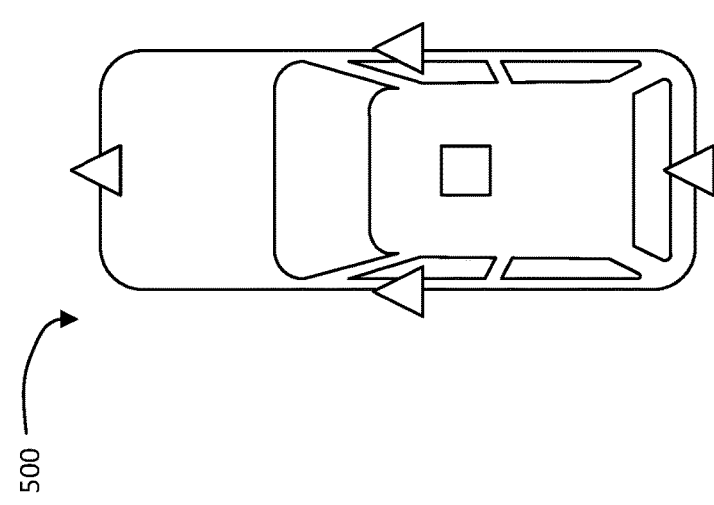
Figure 5B:
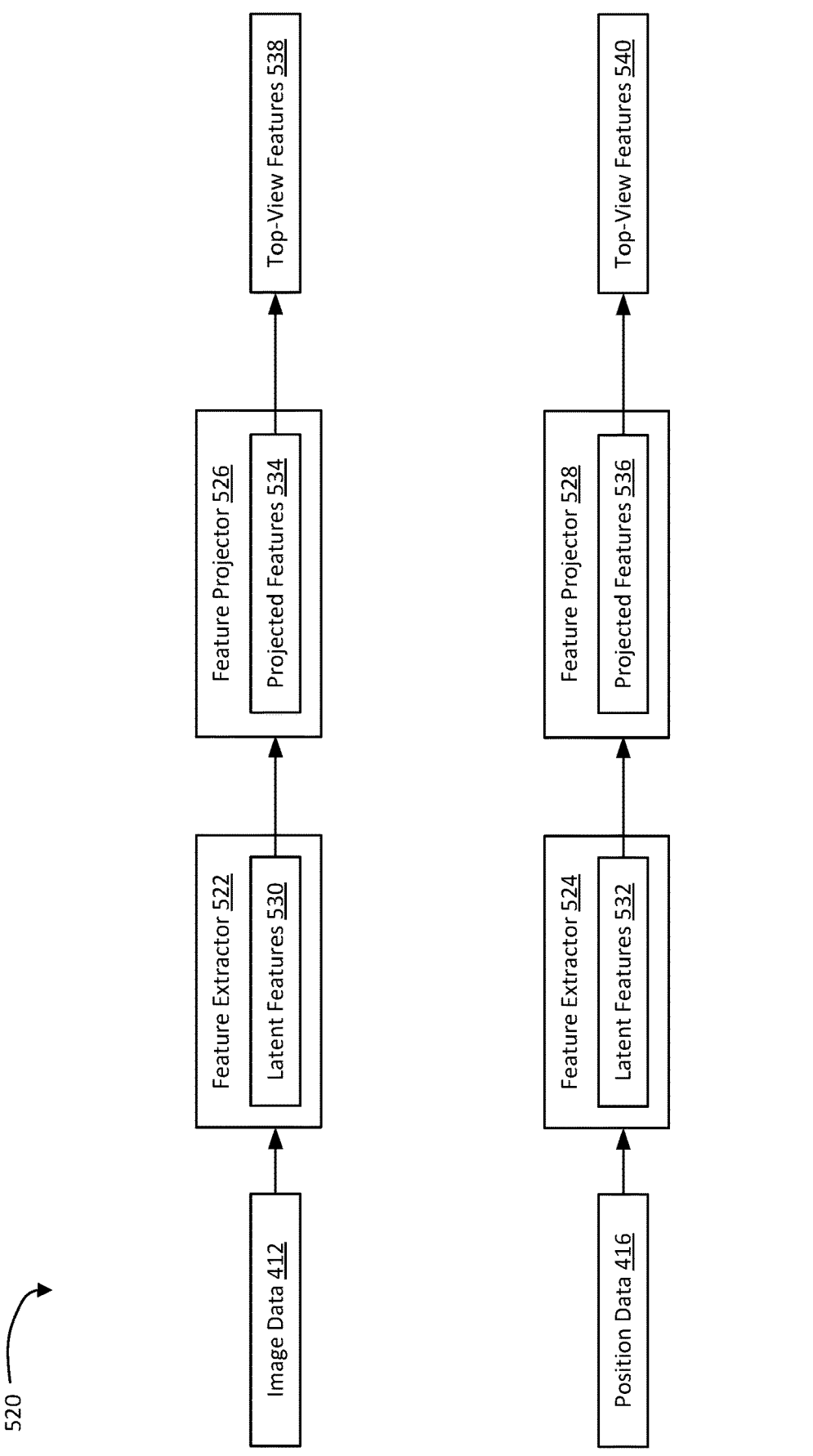
FIG. 5B depicts a top-down feature extraction process according to one aspect of the present disclosure.

In certain implementations, the first set of top-down features 418 and the second set of top-down features 420 may be determined by a top-down feature extraction process. For example, FIG. 5B depicts a feature extraction process 520 according to one aspect of the present disclosure. The top-down feature extraction process 520 may be configured to determine different types of features for different types of sensor data. For example, the top-down feature extraction process 520 may include separate pipelines for determining separate top-down features for image data 412 and position data 416. In particular, the top-down feature extraction process 520 includes a first feature extractor 522 for the image data 412 and a second feature extractor 524 for the position data 416. The feature extractors 522, 524 are configured to determine latent features 530, 532 for the image data 412 and the position data 416. The latent features 530, 532 may be features identified within the image data 412 and the position data 416, such as the example features identified above. The latent features 530, 532 may be identified from the perspective of corresponding sensors. For example, latent features 530 for image data 412 may be identified as locations within the images themselves, or as locations relative to a viewing perspective of the corresponding image sensors. Similarly, the latent features 532 may be identified as three-dimensional locations surrounding the vehicles. In certain implementations, the latent features 530, 532 may be identified separately for each sensor within the first sensor arrangement 404. For example, a separate set of latent features 530 (such as a separate feature vector) may be determined for each image frame within the image data 412. As another example, a separate set of latent features 532 may be determined for each frame of position data received from each position sensor within the position data 416.

The top-down feature extraction process 520 also includes feature projectors 526, 528. The feature projectors 526, 528 may receive the latent features 530, 532 and may determine projected features 534, 536 based on the latent features 530, 532. In particular, the feature projector 526, 528 may transform or otherwise project the locations of features within the latent features 530, 532 into corresponding locations within a top-view representation of the area surrounding the vehicle. As noted previously, top-view representations may be two-dimensional, and the feature projectors 526, 528 may accordingly be configured to project three-dimensional locations of the latent features 530, 532 into corresponding two-dimensional locations within the top-view representation. In implementations where the latent features 530, 532 include multiple feature vectors from multiple locations, the feature projectors 526, 528 may be configured to combine features from multiple feature vectors (such as multiple feature vectors corresponding to the same time interval) into a single set of projected features 534, 536.

Top-view features 538, 540 may be determined based on the projected features 534, 536. For example, the top-view features 538, 540 may be determined to include the values and locations from the projected features 534, 546. In certain implementations, the top-down feature extraction process 520 determines separate sets of top-view features 538 for the image data 412 and top-view features 540 for the position data 416. In such implementations, the first set of top-down features 418 may include multiple sets of top-view features 538, 540.

In the top-down feature extraction process 520, separate pipelines are used to determine top-down features 538, 540 for image data 412 and position data 416. In still further implementations, different pipelines may be used to extract features from the same type of data, such as data captured from different models of sensors, sensors located in different parts of a vehicle, and the like. Furthermore, although the top-down feature extraction process 520 is only depicted as determining top-view features 538, 540 for the image data 412 and the position data 416, it should be understood that the top-down feature extraction process 520 may similarly be used to extract top-down features 420 for the image data 414 and the position data 417. Furthermore, certain implementations may utilize separate top-down feature extraction processes 522 for each of the sensor arrangements 404, 406.

The computing device 402 may be configured to determine, based on the first set of top-down features 418 and the second set of top-down features 420, a transformation 436 to align the second set of top-down features 420 with the first set of top-down features 418. In certain implementations, the transformation 436 may adjust feature values, feature locations, or combinations thereof from the second set of top-down features 420 to align with corresponding features from the first set of top-down features 418. Alignment may include having similar feature values, having the same feature identified in similar locations, and the like. For example, the transformation 436 may be determined as a transformation matrix specifying adjustments, modifications, or other alterations to the second set of top-down features 420. As another example, the transformation 436 may be determined as a mapping between particular features and future values within the second top-down features 420 and corresponding features or feature values within the first top-down features 418. In still further implementations, the transformation 436 may be determined as a model (such as a neural network) that may be trained to transform top-down features from the second sensor arrangement 406 into corresponding top-down features from the first sensor arrangement 404. In certain implementations, the transformation may be determined in a continuous manner (such as without requiring a particular grid).

In certain implementations, to determine the transformation 436, the computing device 402 may be configured to determine, based on a first set of sensor parameters 426 of the first sensor arrangement 404 and a second set of sensor parameters 428 of the second sensor arrangement 406, first differences 422 between the first sensor arrangement 404 and the second sensor arrangement 406. In certain implementations, the first differences 422 may refer to different capabilities of the first sensor arrangement 404 and the second sensor arrangement 406, different physical arrangements of sensors within the first sensor arrangement 404 and the second sensor arrangement 406, and the like. For example, imaging sensors can have different resolution capabilities, different light sensitivities, different fields of view, the number of imaging sensors, positions of imaging sensors on a vehicle, and the like. As another example, position sensors (LIDAR) can have different ranges, accuracies, scanning speeds, angle ranges, number of position sensors, locations on a vehicle, and the like. In certain implementations, the first differences 422 are determined as a weighted difference between the first sensor arrangement 404 and the second sensor arrangement 406 based on a different number of sensors, different field of view coverage for sensors, different sensor ranges, or a combination thereof.

In particular, difference values may be computed for various criteria, such as a difference in the number of image sensors, the number of position sensors, aggregated sensor FOV coverage, and aggregated sensor range. Difference values for the different numbers of image sensors and position sensors may be determined as the absolute value of the difference in these numbers. The aggregated sensor FOV coverage may be determined by projecting the combined FOVs from each of the same type of sensor (such as each of the image sensors, each of the position sensors) onto a unit sphere and computing a percentage of the unit sphere covered by each set of sensors. Separate values may be computed for the FOV coverage of image sensors and the FOV coverage of position sensors. Corresponding values may then be compared between the different sensor arrangements. The aggregated sensor range may be determined by projecting the sensor range for different types of sensors (such as position sensors) onto a unit sphere (such as where the longest-range position sensor sets the base range for the unit sphere. The total volume covered by the sensors in each arrangement may then be compared. In certain instances, the differences values may be combined to form the first differences (such as one or more numerical values representing the first differences). In certain instances, the difference values may be combined in a weighted combination. In other instances, an array, vector, or other combination of the values may be determined based on the difference values to form the first differences.

In certain implementations, to determine the transformation 436, the computing device 402 may be configured to determine, based on the first top-down features 418 and the second top-down features 420, second differences 424 between the first top-down features 418 and the second top-down features 420. In certain implementations, the second differences 424 may refer to different values for features, sensor data, and the like. These differences may be between the first sensor data 408 and the second sensor data 410, the first top-down features 418 and the second top-down features 420, or combinations thereof. For example, the second differences 424 may include photometric or pixel value differences between image data 412, 414 features, intensity histogram differences between position data 416, 417 features, and top-down feature map differences for image data 412, 414 or position data 416, 417.

In certain implementations, the second differences 424 are determined as one or more stochastic distances between the first sensor arrangement 404 and the second sensor arrangement 406 based on different sensor values, different feature values, and different feature locations. Difference values for these comparisons may be computed and combined to form the second differences 424. In certain implementations, sensor values for each type of sensor may be projected onto corresponding spheres surrounding the vehicle (such as separate spheres for image data and position data). Photometric and pixel value changes between spheres for each sensor arrangement may be compared. Similarly, the first set of top-down features 418 and the second set of top-down features 420 may be compared to determine mean differences for features at each location within the top-down representation. In implementations where separate top-down feature vectors are determined for image data and position data, corresponding feature vectors may be compared for the same type of data. Difference values may be calculated at each location within the top-down representation and for each type of data. Additionally or alternatively, one or more aggregated values may be determined by combining these differences. Furthermore, difference values may be computed based on differences between intensity histogram differences for position data. The difference values may be combined or otherwise aggregated to form the second differences 424. In additional or alternative implementations, the second differences 424 may be determined as a weighted combination of these difference values.

In certain implementations, the computing device 402 may be configured to determine the transformation 436 based on the second differences 424, the first differences 422, a first set of latent features 430 for the first sensor data 408, and a second set of latent features 432 for the second sensor data 410. In certain implementations, determining the first top-down features and determining the second top-down features includes determining the first set of latent features 430 based on the first sensor data 408, determining the first top-down features based on the first set of latent features 430, determining the second set of latent features 432 based on the second sensor data 410, and determining the second top-down features based on the second set of latent features 432. The latent features 430, 432 may be determined as part of a feature extraction process, such as the feature extraction process 520. In particular, the latent features 430, 432 may represent features extracted from image data before being combined and projected to form the top-down features 418, 420. For example, the latent features 430, 432 may be determined by a feature extractor 522, 524, similar to the latent features 530, 532.

In certain implementations, the transformation 436 may be determined by applying a correlation alignment process 434 based on the second differences 424, the first differences 422, the first set of latent features 430, and the second set of latent features 432. In certain implementations, the correlation alignment process 434 may be applied to train a machine learning model. For example, the correlation alignment process 434 may be used to train a neural network to transform the second set of top-down features 420 to align with the first set of top-down features 418. In certain implementations, the correlation alignment process 434 may be applied to train a variational autoencoder to minimize statistical differences between the first set of top-down features 418 and the second set of top-down features 420. In such instances, the variational autoencoder may serve as the transformation 436. One skilled in the art will appreciate that variational autoencoders are a type of neural network that can be trained to compress data into different spaces (such as a lower-dimensional space) so that the data can then be reconstructed into another form (such as its original form, a different form).

The statistical differences used to train the variational autoencoder may be determined based on the second differences 424, the first differences 422, the first set of latent features 430, and the second set of late features. For example, the correlation alignment process 434 may be used to train a variational autoencoder to encode data from the first set of top-down features 418 and the second set of top-down features 420 into the same condensed format, which can then be decoded (such as by an accompanying decoder model). In particular, top-down features from the second sensor arrangement 406 (such as the second top-down features 420) can be encoded by the variational autoencoder and then decoded into a format that aligns with top-down features from the first sensor arrangement 404 (such as the first top-down features 418). In certain implementations, the variational autoencoder may be trained using a loss function that penalizes differences between compressed representations of the first top-down features and the second top-down features. For example, the variational autoencoder may be trained to minimize a KL divergence between the first and second top-down features 418, 420.

In certain implementations, the transformation 436 may be further determined based on the first top-down features, the second top-down features, the first set of sensor parameters 426, the second set of sensor parameters 428, or a combination thereof. For example, the loss function used to train the variational autoencoder may be determined based on one or more of the difference values described for the first differences 422 and the second differences 424.

In certain implementations, the transformation 436 may be determined in response to determining that (i) the second differences 424 exceed a first predetermined threshold, (ii) the first differences 422 exceed a second predetermined threshold, or (iii) a combination thereof. In certain implementations, it may only be necessary to determine a transformation 436 between two different sensor arrangements 500, 510 if there are significant differences between the first and second sensor arrangements 404, 406 (e.g., indicated by the first differences 422), between the first and second sets of top-down features 418, 420 (e.g., indicated by the second differences 424), or combinations thereof. Accordingly, the computing device 402 may be configured to only determine the transformation 436 if the first differences 422 and/or the second differences 424 exceed predetermined thresholds (such as 5%, 10%, 25%, 50%, and the like).

The computing device 402 may be configured to determine, based on the transformation 436, vehicle control instructions 438 for a vehicle, such as the vehicle 100. In certain implementations, determining the vehicle control instructions 438 includes determining transformed sensor data by applying the transformation 436 to subsequent sensor data received from the second sensor arrangement 406. The vehicle control instructions 438 may then be determined, using a model, based on the transformed sensor data. In certain implementations, the model may be trained based on features extracted from sensor data received from the first sensor arrangement 404. The transformed sensor data may be determined by the transformer 436 to align with top-down features from the first sensor arrangement. Accordingly, the transformation 436 may enable the model to be used to determine vehicle control instructions 438 for vehicles with the second sensor arrangement 406, without having to re-train or update the model.

In certain implementations, the computing device 402 is described above as using one or more models. These models may be implemented as one or more machine learning models, including supervised learning models, unsupervised learning models, other types of machine learning models, and/or other types of predictive models. For example, models may be implemented as one or more of a neural network, a transformer model, a decision tree model, a support vector machine, a Bayesian network, a classifier model, a regression model, or combinations thereof. The models may be trained based on training data to perform any of their above-described functionality. For example, one or more training datasets may be used that contain training data, which may specify one or more expected outputs. Parameters of the model may be updated based on whether the model generates correct outputs when compared to the expected outputs. In particular, a model may receive one or more pieces of input data from the training data sets that are associated with a plurality of expected outputs. The model may generate predicted outputs based on a current configuration of the model. The predicted outputs may be compared to the expected outputs and one or more parameter updates may be computed based on differences between the predicted outputs and the expected outputs. In particular, the parameters may include weights (e.g., priorities) for different features and combinations of features. The parameter updates to the model may include updating one or more of the features analyzed and/or the weights assigned to different features or combinations of features (e.g., relative to the current configuration of the model).

Specific implementations discussed above may utilize encoder models, decoder models, or combinations thereof. Encoder models may be machine learning models trained to take input data (such as an input image, an input position scan) and encode the input into a lower-dimensional representation, which can be used for various downstream tasks such as classification or object detection. In certain implementations, encoder models may be implemented as neural networks (such as convolutional neural networks, recurrent neural networks), transformer models, autoencoder models, and the like. Decoder models may be machine learning models trained to take an input of one or more features and to generate output data (such as an output image, output position scan) based on the received input. In certain implementations, decoder models may work in the opposite direction of encoder models. In certain implementations, decoder models may be implemented as neural networks (such as convolutional neural networks, recurrent neural networks), transformer models, autoencoder models, and the like.

One method of performing image processing according to embodiments described above is shown in FIG. 6. FIG. 6 is a flow chart illustrating an example method 600 for alignment of sensor data and top-down features between different sensor arrangements. The method may be performed by one or more of the above systems, such as the systems 100, 200, 300, 400. The method 600 may be implemented on a computer system, such as the system 400. For example, the method 600 may be implemented by the computing device 402. The method 600 may also be implemented by a set of instructions stored on a computer readable medium that, when executed by a processor, cause the computing device to perform the method 600. Although the examples below are described with reference to the flowchart illustrated in FIG. 6, many other methods of performing the acts associated with FIG. 6 may be used. For example, the order of some of the blocks may be changed, certain blocks may be combined with other blocks, one or more of the blocks may be repeated, and some of the blocks may be optional.

The method 600 includes receiving first sensor data from a first sensor arrangement and second sensor data from a second sensor arrangement (block 602). For example, the computing device 402 may receive first sensor data 408 from a first sensor arrangement 404 and second sensor data 410 from a second sensor arrangement 406. In certain implementations, the first sensor data 408 may represent a source domain and the second sensor data 410 may represent a target domain, such as for the purposes of a domain alignment process. In certain implementations, the first sensor arrangement 404 and the second sensor arrangement 406 may include different combinations and/or different physical arrangements of one or more sensors located on corresponding vehicles. In certain implementations, (i) the first sensor arrangement 404 includes a LIDAR sensor and the second sensor arrangement 406 does not or (ii) the second sensor arrangement 406 includes a LIDAR sensor and the first sensor arrangement 404 does not.

The method 600 includes determining, based on the first sensor data, a first set of top-down features and, based on the second sensor data, a second set of top-down features (block 604). For example, the computing device 402 may determine, based on the first sensor data 408, a first set of top-down features 418 and, based on the second sensor data 410, a second set of top-down features 420. In certain implementations, the first set of top-down features 418 and the and the second set of top-down features 420 may be determined using a feature extraction process, such as the top-down feature extraction process 520.

The method 600 includes determining, based on the first set of top-down features and the second set of top-down features, a transformation to align the second set of top-down features with the first set of top-down features (block 606). For example, the computing device 402 may determine, based on the first set of top-down features 418 and the second set of top-down features 420, a transformation 436 to align the second set of top-down features 420 with the first set of top-down features 418. In certain implementations, the transformation 436 adjusts feature values, feature locations, or combinations thereof from the second set of top-down features 420 to align with corresponding features from the first set of top-down features 418. In certain implementations, determining the transformation 436 further includes determining, based on a first set of sensor parameters 426 the first sensor arrangement 404 and a second set of sensor parameters 428 of the second sensor arrangement 406, first differences 422 between the first sensor arrangement 404 and the second sensor arrangement 406. In certain implementations, determining the the transformation 436 includes determining, based on the first top-down features and the second top-down features, second differences 424 between the first top-down features and the second top-down features. In certain implementations, the second differences 424 may refer to different values for features, sensor data, and the like. These differences may be between the first sensor data 408 and the second sensor data 410, the first top-down features and the second top-down features, or combinations thereof. In certain implementations, the second differences 424 are determined as one or more stochastic distances between the first sensor arrangement 404 and the second sensor arrangement 406 based on different sensor values, different feature values, and different feature locations. In certain implementations, the transformation 436 is determined based on the second differences 424, the first differences 422, a first set of latent features 430 for the first sensor data 408, and a second set of latent features 432 for the second sensor data 410. In certain implementations, determining the first top-down features and determining the second top-down features includes determining the first set of latent features 430 based on the first sensor data 408, determining the first top-down features based on the first set of latent features 430, determining the second set of latent features 432 based on the second sensor data 410, and determining the second top-down features based on the second set of latent features 432. In certain implementations, the transformation 436 may be determined by applying a correlation alignment process 434 based on the second differences 424, the first differences 422, the first set of latent features 430, and the second set of latent features 432. In certain implementations, the correlation alignment process 434 may be applied to train a machine learning model. For example, the correlation alignment process 434 may be applied to train a variational autoencoder to minimize statistical differences between the first set of top-down features 418 and the second set of top-down features 420. The statistical differences may be determined based on the second differences 424, the first differences 422, the first set of latent features 430, and the second set of latent features 432. In certain implementations, the transformation 436 may be determined in response to determining that (i) the second differences 424 exceed a first predetermined threshold, (ii) the first differences 422 exceed a second predetermined threshold, or (iii) a combination thereof. In certain implementations, the transformation may be determined in a continuous manner (such as without requiring a particular grid).

The method 600 includes determining, based on the transformation, vehicle control instructions for a vehicle (block 608). For example, the computing device 402 may determine, based on the transformation 436, vehicle control instructions 438 for a vehicle. In certain implementations, determining the vehicle control instructions 438 may include determining transformed sensor data by applying the transformation 436 to subsequent sensor data received from the second sensor arrangement 406, and determining, based on the transformed sensor data, the vehicle control instructions 438 using a model. The model may be trained to receive sensor data from the first sensor arrangement 404.

It is noted that one or more blocks (or operations) described with reference to FIG. 5 may be combined with one or more blocks (or operations) described with reference to another of the figures. For example, one or more blocks (or operations) of FIG. 5B may be combined with one or more blocks (or operations) of FIG. 1-3. As another example, one or more blocks associated with FIG. 5B may be combined with one or more blocks associated with FIG. 4.

In one or more aspects, techniques for supporting vehicular operations may include additional aspects, such as any single aspect or any combination of aspects described below or in connection with one or more other processes or devices described elsewhere herein.

In a first aspect, a method is provided that includes receiving first sensor data from a first sensor arrangement and second sensor data from a second sensor arrangement, wherein at least one of the first sensor data and the second sensor data include both image data and position data. The method further includes determining, based on the first sensor data, a first set of top-down features and, based on the second sensor data, a second set of top-down features and determining, based on the first set of top-down features and the second set of top-down features, a transformation to align the second set of top-down features with the first set of top-down features. The method also includes determining, based on the transformation, vehicle control instructions for a vehicle.

In a second aspect according to one the first aspect, the method further includes determining, based on a first set of sensor parameters of the first sensor arrangement and a second set of sensor parameters of the second sensor arrangement, first differences between the first sensor arrangement and the second sensor arrangement; and determining, based on the first set of top-down features and the second set of top-down features, second differences between the first set of top-down features and the second set of top-down features.

In a third aspect according to the second aspect, the first differences are determined as a weighted difference between the first sensor arrangement and the second sensor arrangement based on a different number of sensors, different field of view coverage for sensors, different sensor ranges, or a combination thereof.

In a fourth aspect according to one or more of the third aspect through the fourth aspect, the second differences are determined as one or more stochastic distances between the first sensor arrangement and the second sensor arrangement based on different sensor values, different feature values, and different feature locations.

In a fifth aspect according to one or more of the second aspect through the fourth aspect, the method further includes determining the transformation based on the second differences, the first differences, a first set of latent features for the first sensor data, and a second set of latent features for the second sensor data.

In a sixth aspect according to the fifth aspect, determining the first set of top-down features and determining the second set of top-down features includes determining the first set of latent features based on the first sensor data; determining the first set of top-down features based on the first set of latent features; determining the second set of latent features based on the second sensor data; and determining the second set of top-down features based on the second set of latent features.

In a seventh aspect according to one or more of the fifth aspect through the sixth aspect, the transformation is determined by training a variational autoencoder to minimize statistical differences between the first set of top-down features and the second set of top-down features. The statistical differences may be determined based on the second differences, the first differences, the first set of latent features, and the second set of latent features.

In an eighth aspect according to one or more of the second aspect through the seventh aspect, the transformation is determined in response to determining that (i) the second differences exceed a first predetermined threshold, (ii) the first differences exceed a second predetermined threshold, or (iii) a combination thereof.

In a ninth aspect, a system is provided that includes a processing system including one or more processors and one or more memories storing instructions which, when executed by the processing system, cause the processing system to perform operations. The operations include receiving first sensor data from a first sensor arrangement and second sensor data from a second sensor arrangement, wherein at least one of the first sensor data and the second sensor data include both image data and position data. The operations further include determining, based on the first sensor data, a first set of top-down features and, based on the second sensor data, a second set of top-down features and determining, based on the first set of top-down features and the second set of top-down features, a transformation to align the second set of top-down features with the first set of top-down features. The operations also include determining, based on the transformation, vehicle control instructions for a vehicle. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a tenth aspect according to the ninth aspect, the operations further include determining, based on a first set of sensor parameters of the first sensor arrangement and a second set of sensor parameters of the second sensor arrangement, first differences between the first sensor arrangement and the second sensor arrangement; and determining, based on the first set of top-down features and the second set of top-down features, second differences between the first set of top-down features and the second set of top-down features.

In an eleventh aspect according to the tenth aspect, a system, wherein the first differences are determined as a weighted difference between the first sensor arrangement and the second sensor arrangement based on a different number of sensors, different field of view coverage for sensors, different sensor ranges, or a combination thereof.

In a twelfth aspect according to one or more of the tenth aspect through the eleventh aspect, the second differences are determined as one or more stochastic distances between the first sensor arrangement and the second sensor arrangement based on different sensor values, different feature values, and different feature locations.

In a thirteenth aspect according to one or more of the tenth aspect through the twelfth aspect, the operations further include determining the transformation based on the second differences, the first differences, a first set of latent features for the first sensor data, and a second set of latent features for the second sensor data.

In a fourteenth aspect according to the thirteenth aspect, determining the first set of top-down features and determining the second set of top-down features includes determining the first set of latent features based on the first sensor data; determining the first set of top-down features based on the first set of latent features; determining the second set of latent features based on the second sensor data; and determining the second set of top-down features based on the second set of latent features.

In a fifteenth aspect according to one or more of the thirteenth aspect through the fourteenth aspect, the transformation is determined by training a variational autoencoder to minimize statistical differences between the first set of top-down features and the second set of top-down features, wherein the statistical differences are determined based on the second differences, the first differences, the first set of latent features, and the second set of latent features.

In a sixteenth aspect according to one or more of the tenth aspect through the fifteenth aspect, the transformation is determined in response to determining that (i) the second differences exceed a first predetermined threshold, (ii) the first differences exceed a second predetermined threshold, or (iii) a combination thereof.

In a seventeenth aspect, a non-transitory, computer-readable medium is provided storing instructions which, when executed by a processor, cause the processor to perform operations. The operations include receiving first sensor data from a first sensor arrangement and second sensor data from a second sensor arrangement, wherein at least one of the first sensor data and the second sensor data include both image data and position data. The operations further include determining, based on the first sensor data, a first set of top-down features and, based on the second sensor data, a second set of top-down features and determining, based on the first set of top-down features and the second set of top-down features, a transformation to align the second set of top-down features with the first set of top-down features. The operations also include determining, based on the transformation, vehicle control instructions for a vehicle.

In an eighteenth aspect according to the seventeenth aspect, the operations further include determining, based on a first set of sensor parameters of the first sensor arrangement and a second set of sensor parameters of the second sensor arrangement, first differences between the first sensor arrangement and the second sensor arrangement; and determining, based on the first set of top-down features and the second set of top-down features, second differences between the first set of top-down features and the second set of top-down features.

In a nineteenth aspect according to the eighteenth aspect, the first differences are determined as a weighted difference between the first sensor arrangement and the second sensor arrangement based on a different number of sensors, different field of view coverage for sensors, different sensor ranges, or a combination thereof.

In a twentieth aspect according to one or more of the eighteenth aspect through the nineteenth aspect, the second differences are determined as one or more stochastic distances between the first sensor arrangement and the second sensor arrangement based on different sensor values, different feature values, and different feature locations.

In a twenty-first aspect according to one or more of the eighteenth aspect through the twentieth aspect, the operations further include determining the transformation based on the second differences, the first differences, a first set of latent features for the first sensor data, and a second set of latent features for the second sensor data.

In a twenty-second aspect according to the twenty-first aspect, determining the first set of top-down features and determining the second set of top-down features includes determining the first set of latent features based on the first sensor data; determining the first set of top-down features based on the first set of latent features; determining the second set of latent features based on the second sensor data; and determining the second set of top-down features based on the second set of latent features.

In a twenty-third aspect according to one or more of the twenty-first aspect through the twenty-second aspect, the transformation is determined by training a variational auto-encoder to minimize statistical differences between the first set of top-down features and the second set of top-down features, wherein the statistical differences are determined based on the second differences, the first differences, the first set of latent features, and the second set of latent features.

In a twenty-fourth aspect, a vehicle is provided that includes a processing system including one or more processors and one or more memories storing instructions which, when executed by the processing system, cause the processing system to perform operations. The operations include receiving first sensor data from a first sensor arrangement and second sensor data from a second sensor arrangement, wherein at least one of the first sensor data and the second sensor data include both image data and position data. The operations further include determining, based on the first sensor data, a first set of top-down features and, based on the second sensor data, a second set of top-down features and determining, based on the first set of top-down features and the second set of top-down features, a transformation to align the second set of top-down features with the first set of top-down features. The operations also include determining, based on the transformation, vehicle control instructions for a vehicle.

In a twenty-fifth aspect according to the twenty-fourth aspect, the operations further include determining, based on a first set of sensor parameters of the first sensor arrangement and a second set of sensor parameters of the second sensor arrangement, first differences between the first sensor arrangement and the second sensor arrangement; and determining, based on the first set of top-down features and the second set of top-down features, second differences between the first set of top-down features and the second set of top-down features.

In a twenty-sixth aspect according to the twenty-fifth aspect, the first differences are determined as a weighted difference between the first sensor arrangement and the second sensor arrangement based on a different number of sensors, different field of view coverage for sensors, different sensor ranges, or a combination thereof.

In a twenty-seventh aspect according to one or more of the twenty-fifth aspect through the twenty-sixth aspect, the second differences are determined as one or more stochastic distances between the first sensor arrangement and the second sensor arrangement based on different sensor values, different feature values, and different feature locations.

In a twenty-eighth aspect according to one or more of the twenty-fifth aspect through the twenty-seventh aspect, the operations further include determining the transformation based on the second differences, the first differences, a first set of latent features for the first sensor data, and a second set of latent features for the second sensor data.

In a twenty-ninth aspect according to the twenty-eighth aspect, determining the first set of top-down features and determining the second set of top-down features includes determining the first set of latent features based on the first sensor data; determining the first set of top-down features based on the first set of latent features; determining the second set of latent features based on the second sensor data; and determining the second set of top-down features based on the second set of latent features.

In a thirtieth aspect according to one or more of the twenty-eighth aspect through the twenty-ninth aspect, the transformation is determined by training a variational auto-encoder to minimize statistical differences between the first set of top-down features and the second set of top-down features, wherein the statistical differences are determined based on the second differences, the first differences, the first set of latent features, and the second set of latent features.

Components, the functional blocks, and the modules described herein with respect to FIGS. 1-4 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method comprising:

receiving first sensor data from a first sensor arrangement and second sensor data from a second sensor arrangement, wherein the first sensor arrangement is associated with a first vehicle type and the second sensor arrangement is associated with a second vehicle type different from the first vehicle type, and wherein at least one of the first sensor data and the second sensor data include both image data and position data;

determining, based on a first set of sensor parameters of the first sensor arrangement and a second set of sensor parameters of the second sensor arrangement, first differences between the first sensor arrangement and the second sensor arrangement;

determining, based on the first sensor data, a first set of top-down features and, based on the second sensor data, a second set of top-down features;

determining, based on the first differences, the first set of top-down features, and the second set of top-down features, a transformation to align the second set of top-down features with the first set of top-down features within a top view representation; and determining, based on the transformation, vehicle control instructions for a vehicle of the second vehicle type.

2. The method of claim 1, further comprising:

determining, based on the first set of top-down features and the second set of top-down features, second differences between the first set of top-down features and the second set of top-down features.

3. The method of claim 2, wherein the second differences are determined as one or more stochastic distances between the first sensor arrangement and the second sensor arrangement based on different sensor values, different feature values, and different feature locations.

4. The method of claim 2, further comprising:

determining the transformation based on the second differences, a first set of latent features for the first sensor data, and a second set of latent features for the second sensor data.

5. The method of claim 4, wherein determining the first set of top-down features and determining the second set of top-down features comprises:

determining the first set of latent features based on the first sensor data;

determining the first set of top-down features based on the first set of latent features;

determining the second set of latent features based on the second sensor data; and determining the second set of top-down features based on the second set of latent features.

6. The method of claim 4, wherein the transformation is determined by training a variational autoencoder to minimize statistical differences between the first set of top-down features and the second set of top-down features, wherein the statistical differences are determined based on the second differences, the first differences, the first set of latent features, and the second set of latent features.

7. The method of claim 2, wherein the transformation is determined in response to determining that (i) the second differences exceed a first predetermined threshold, (ii) the first differences exceed a second predetermined threshold, or (iii) a combination thereof.

8. The method of claim 1, wherein the first differences are determined as a weighted difference between the first sensor arrangement and the second sensor arrangement based on a different number of sensors, different field of view coverage for sensors, different sensor ranges, or a combination thereof.

9. A system comprising:

a processing system including one or more processors and one or more memories storing instructions which, when executed by the processing system, cause the processing system to perform operations comprising:

receiving first sensor data from a first sensor arrangement and second sensor data from a second sensor arrangement, wherein the first sensor arrangement is associated with a first vehicle type and the second sensor arrangement is associated with a second vehicle type different from the first vehicle type, and wherein at least one of the first sensor data and the second sensor data include both image data and position data;

determining, based on a first set of sensor parameters of the first sensor arrangement and a second set of sensor parameters of the second sensor arrangement, first differences between the first sensor arrangement and the second sensor arrangement;

determining, based on the first sensor data, a first set of top-down features and, based on the second sensor data, a second set of top-down features;

determining, based on the first differences, the first set of top-down features, and the second set of top-down features, a transformation to align the second set of top-down features with the first set of top-down features within a top view representation; and determining, based on the transformation, vehicle control instructions for a vehicle of the second vehicle type.

10. The system of claim 9, wherein the operations further comprise:

determining, based on the first set of top-down features and the second set of top-down features, second differences between the first set of top-down features and the second set of top-down features.

11. The system of claim 10, wherein the second differences are determined as one or more stochastic distances between the first sensor arrangement and the second sensor arrangement based on different sensor values, different feature values, and different feature locations.

12. The system of claim 10, wherein the operations further comprise:

determining the transformation based on the second differences, a first set of latent features for the first sensor data, and a second set of latent features for the second sensor data.

13. The system of claim 12, wherein determining the first set of top-down features and determining the second set of top-down features comprises:

determining the first set of latent features based on the first sensor data;

determining the first set of top-down features based on the first set of latent features;

determining the second set of latent features based on the second sensor data; and determining the second set of top-down features based on the second set of latent features.

14. The system of claim 12, wherein the transformation is determined by training a variational autoencoder to minimize statistical differences between the first set of top-down features and the second set of top-down features, wherein the statistical differences are determined based on the second differences, the first differences, the first set of latent features, and the second set of latent features.

15. The system of claim 10, wherein the transformation is determined in response to determining that (i) the second differences exceed a first predetermined threshold, (ii) the first differences exceed a second predetermined threshold, or (iii) a combination thereof.

16. The system of claim 9, wherein the first differences are determined as a weighted difference between the first sensor arrangement and the second sensor arrangement based on a different number of sensors, different field of view coverage for sensors, different sensor ranges, or a combination thereof.

17. A non-transitory, computer-readable medium storing instructions which, when executed by a processor, cause the processor to perform operations comprising:

receiving first sensor data from a first sensor arrangement and second sensor data from a second sensor arrangement, wherein the first sensor arrangement is associated with a first vehicle type and the second sensor arrangement is associated with a second vehicle type different from the first vehicle type, and wherein at least one of the first sensor data and the second sensor data include both image data and position data;

determining, based on a first set of sensor parameters of the first sensor arrangement and a second set of sensor parameters of the second sensor arrangement, first differences between the first sensor arrangement and the second sensor arrangement;

determining, based on the first sensor data, a first set of top-down features and, based on the second sensor data, a second set of top-down features;

determining, based on the first differences, the first set of top-down features, and the second set of top-down features, a transformation to align the second set of top-down features with the first set of top-down features within a top view representation; and determining, based on the transformation, vehicle control instructions for a vehicle of the second vehicle type.

18. The non-transitory, computer-readable medium of claim 17, wherein the operations further comprise:

determining, based on the first set of top-down features and the second set of top-down features, second differences between the first set of top-down features and the second set of top-down features.

19. The non-transitory, computer-readable medium of claim 18, wherein the second differences are determined as one or more stochastic distances between the first sensor arrangement and the second sensor arrangement based on different sensor values, different feature values, and different feature locations.

20. The non-transitory, computer-readable medium of claim 18, wherein the operations further comprise:

determining the transformation based on the second differences, a first set of latent features for the first sensor data, and a second set of latent features for the second sensor data.

21. The non-transitory, computer-readable medium of claim 20, wherein determining the first set of top-down features and determining the second set of top-down features comprises:

determining the first set of latent features based on the first sensor data;

determining the first set of top-down features based on the first set of latent features;

determining the second set of latent features based on the second sensor data; and determining the second set of top-down features based on the second set of latent features.

22. The non-transitory, computer-readable medium of claim 20, wherein the transformation is determined by training a variational autoencoder to minimize statistical differences between the first set of top-down features and the second set of top-down features, wherein the statistical differences are determined based on the second differences, the first differences, the first set of latent features, and the second set of latent features.

23. The non-transitory, computer-readable medium of claim 17, wherein the first differences are determined as a weighted difference between the first sensor arrangement and the second sensor arrangement based on a different number of sensors, different field of view coverage for sensors, different sensor ranges, or a combination thereof.

24. A vehicle comprising:

a processing system including one or more processors and one or more memories storing instructions which, when executed by the processing system, cause the processing system to perform operations comprising:

receiving first sensor data from a first sensor arrangement and second sensor data from a second sensor arrangement, wherein the first sensor arrangement is associated with a first vehicle type and the second sensor arrangement is associated with a second vehicle type different from the first vehicle type, and wherein at least one of the first sensor data and the second sensor data include both image data and position data;

determining, based on a first set of sensor parameters of the first sensor arrangement and a second set of sensor parameters of the second sensor arrangement, first differences between the first sensor arrangement and the second sensor arrangement;

determining, based on the first sensor data, a first set of top-down features and, based on the second sensor data, a second set of top-down features;

determining, based on the first differences, the first set of top-down features, and the second set of top-down features, a transformation to align the second set of top-down features with the first set of top-down features within a top view representation; and determining, based on the transformation, vehicle control instructions for a vehicle of the second vehicle type.

25. The vehicle of claim 24, wherein the operations further comprise:

determining, based on the first set of top-down features and the second set of top-down features, second differences between the first set of top-down features and the second set of top-down features.

26. The vehicle of claim 25, wherein the second differences are determined as one or more stochastic distances between the first sensor arrangement and the second sensor arrangement based on different sensor values, different feature values, and different feature locations.

27. The vehicle of claim 25, wherein the operations further comprise:

determining the transformation based on the second differences, a first set of latent features for the first sensor data, and a second set of latent features for the second sensor data.

28. The vehicle of claim 27, wherein determining the first set of top-down features and determining the second set of top-down features comprises:

determining the first set of latent features based on the first sensor data;

determining the first set of top-down features based on the first set of latent features;

determining the second set of latent features based on the second sensor data; and determining the second set of top-down features based on the second set of latent features.

29. The vehicle of claim 27, wherein the transformation is determined by training a variational autoencoder to minimize statistical differences between the first set of top-down features and the second set of top-down features, wherein the statistical differences are determined based on the second differences, the first differences, the first set of latent features, and the second set of latent features.

30. The vehicle of claim 24, wherein the first differences are determined as a weighted difference between the first sensor arrangement and the second sensor arrangement based on a different number of sensors, different field of view coverage for sensors, different sensor ranges, or a combination thereof.

\* \* \* \* \*